United States Patent Office 3,272,633
Patented Sept. 13, 1966

3,272,633
PREPARATION OF ACTIVE FERMENTATION
BROTHS FROM STABLE INGREDIENTS
Forest H. Clickner, Chicago, Ill. (R.D. 3, Mendota, Ill.)
No Drawing. Continuation of application Ser. No. 76,447, Dec. 19, 1960. This application Apr. 28, 1964, Ser. No. 363,275
6 Claims. (Cl. 99—9)

This application is a continuation of my application Ser. No. 76,447, filed December 19, 1960, now abandoned, which was a continuation-in-part of my copending application Ser. No. 705,114, filed December 26, 1957, now Patent No. 2,965,489.

The present invention relates to preparation of active fermentation broths from stable ingredients. More in particular this invention relates to the product and method for preparing a viable artificial fermentation broth from stable substances commercially obtainable as staples, for use as a basic ingredient in the subsequent manufacture of certain liquid animal and poultry food supplements.

It has been generally known that livestock are greatly improved in their health and rate of growth when fed with a high vitamin diet. It has also been observed that the fluid fermentation products from fresh whole fermentation broth derived as a by-product from processes such as brewing, liquor distilling, cheese making and certain other food refining industries, contains substances with growth stimulating factors not due to known vitamins in their dehydrated and concentrated forms. It has been the general practice in food processing industries such as brewing, liquor distilling, sugar refining, cheese making and others, to discard the fluid fraction of fermentation broths or to treat it and then feed it in fresh form to livestock.

Whole fermentable broths are notoriously difficult to store due to the fact that bacterial and enzymatic action at normal temperatures produces rapid and uncontrolled biological reactions which result in making whole fermentation broths unfit for animal consumption. Accordingly most of these whole fermentation broths are now disposed of as waste or immediately concentrated by dehydration into less viable products because of the difficulties of storing them in viable forms and shipping them in a viable state for later feeding to livestock.

As described in my Patent No. 2,965,489, I invented an improved process for stabilizing or preserving at ambient temperatures whole fermentation broths including the fluid fractions. The said patent describes a novel process for controlling the multiplication and development of aerobic bacterial mold and fungus found on the surface of fermentation solutions and an aerobic bacteria, yeast, and mold found in the interior and lower portions of whole fermented broths. However, owing to the rapid deterioration or putrefaction of whole fermentation broths derived as by-products of certain industrial processes (e.g. brewing) it is imperative that the process, described in my above mentioned patent, for preparing stabilized liquid animal and poultry food supplements, be performed promptly after the whole fermentation broth becomes available. In essence this means that the facilities for processing whole fermentation broth must necessarily be located close to the plant which produces the by-product broth.

Furthermore, to avoid waste the capacity of the process equipment must be sufficiently large to handle promptly the maximum amount of by-product fermentation broth which might become available at any given time. From this it is apparent that the process described in my above mentioned patent imposes a considerable economic difficulty in the commercial preparation of stabilized liquid animal and poultry food supplements in accordance therewith. It is therefore a prime object of the present invention to provide an active artificial fermentation broth which overcomes the aforesaid difficulties.

A further object of this invention is to provide an improved method for preparing active artificial fermentation broths using stable materials from commercially available staple products.

Another object of this invention is to provide an improved active artificial fermentation broth for use in the preparation of stablized liquid animal and poultry food supplements.

Still another object of my invention is to provide an artificial fermentation broth adjusted to avoid spoilage at ambient temperatures for an indefinite period of time.

A still further object of this invention is to provide active artificial fermentation products in aqueous solutions produced for specific animals and poultry with the whole culture enzymatic fractions intact and available for use as food supplements.

Another object of my invention is to provide a method of preparing an animal and poultry food supplement enriched in the known vitamins and further enriched with enzymatic and fermentation products.

Yet another object of this invention is to provide a stablized livestock food supplement containing vitamins, fermentation products, and trace minerals in convenient aqueous solution which may be added to the normal grain and fodder livestock feeds as well as drinking water without risk of loss in the livestock feeding yard and in a form which assures equal distribution of the food supplement to each individual animal or bird.

These and other objects and advantages of the present invention will become more apparent from the ensuing description thereof, including specific embodiments, and the appended claims.

The present invention comprises briefly the preparation of biologically active artificial fermentation broths from stable materials which broths form primary ingredients in the subsequent preparation of viable yet stable animal food supplement products. Broadly the invention comprises first mixing together non-legume cereal products high in starch content with barley malt to form a fermentable composition or artificial wort water. To the fermentable composition thus formed is added commercial *Aspergillus oryzae*. Later, when the fermentation rate of the above mixture becomes retarded, *Bacillus subtilis* culture is added and again the resulting mixture is allowed to ferment until the rate of fermentation becomes retarded. Then Lactobacillus in substantially dry form is added and the mixture thus obtained is fermented. The total fermentation is carried out in a period of about 48 hours at a temperature substantially equal to the body temperature of the particular type of animal that the feed supplement end product is intended for. Subsequently liquid or dry form whole broth cultures of riboflavin and vitamin B12 are added and finally saccharides or sugars. In certain cases acid is added to adjust the pH value to between 4.00 and 5.80. The saccharides or sugars are added to adjust the osmotic pressure to between 85 and 100 atmospheres. The composition thus obtained is viable but its biological activity is stablized at ambient temperatures by the addition of the last mentioned non-polar water soluble non-toxic substances.

An example illustrating ranges of proportions of materials employed in accordance with the process described in my above mentioned patent is shown below:

Ingredient 1. Whole fermentation broth, 12–40% by volume
Ingredient 2. Vitamin $B_2$, $B_{12}$ broth, 1–15% by volume
Ingredient 3. Sugar syrup (unrefined), 55–78% by volume Ingredient 4. Acid (phosphoric or lactic), 4.00–5.80 pH if necessary to (preferably adjusted to near 4.50)

Osmotic pressure adjusted, by the addition of the sugar fraction, to between 85–100 atmospheres, preferably near 90 atmospheres.[1]

[1] Gas pressures in terms of standard and pressure conditions.

Vitamins additives to assure pre-selected concentrations.

The gist of the present invention is the preparation of a novel substitute for the Ingredient 1 above from initially stable materials commercially available as staple products thereby obviating the necessity of employing biologically unstable by-products from certain industries described previously. The term "whole fermentation broth" as employed herein is intended to mean the naturally formed broth obtained as an industrial by-product (e.g.: wort water) and the term "active artificial fermentation broth" is intended to mean the fermentation broth produced according to this invention which is prepared from stable materials.

Broadly the preparation of active artificial fermentation broth as a substitute for whole fermentation broth (Ingredient 1 above) comprises the following steps including the proportional ranges of materials therefor:

(a) Non-legume cereal products (preferably high in starch content) _____lbs__ [1] 6–8
(b) Barley malt _____lbs__ [2] 6–10
(c) Water (tap) _____gals__ 100

[1] Equivalent in starch content based on this amount of corn starch.
[2] Amount sufficient to convert the starch in (a).

It will be noted that the amount of barley malt added is equal to the amount required to convert (react) with all starch present in the cereal.

The above mentioned three materials are mixed together at ambient temperature to form a fermentable composition or artificial wort water as the first process step. Examples of the non-legume cereal products which may be satisfactorily employed are corn, barley, oats and wheat. Corn cereal (85% starch) in 8 lb. proportion was used in the specific example shown later herein.

As the second step of the process the following mixture is prepared.

Fermentable composition (from first step)__gals__ [1] 100
(d) *Aspergillus oryzae* culture (dry basis)__lbs__ 0.8–1.6

[1] Approximate.

The resulting mixture is allowed to ferment at the approximate body temperature of the animal to which the end product food supplement is intended but not exceeding 115° F., until the fermentation rate thereof becomes retarded. The *Aspergillus oryzae* is a specie of a non-pathogenic fungous culture Aspergillus. Other non-pathogenic species of the genus Aspergillus such as *Aspergillus niger* may be satisfactorily employed but the species *Aspergillus oryzae* is preferred.

To the fermented mixture obtained from the second step is added, as the third step of the process, the following substance.

(e) *Bacillus subtilis* culture (dry basis) __lbs__ 0.4–1.2

The resulting mixture is again allowed to ferment at the same temperature as that of the second process until the fermentation rate thereof again becomes retarded.

To the fermented mixture obtained from the third step of the process is added, as the fourth step of the process, the following substance.

(f) Lactobacillus culture (dry basis) ____lbs__ 0.6–1.0

The resulting mixture is again allowed to ferment at the same temperature employed in the fermentation during the second and third steps of the process. The aggregate time for the fermentation during the second, third and fourth steps of the process should be about 48 hours.

The resulting composition obtained at the end of the above described fourth step of the process is a viable liquid active artificial fermentation broth and may advantageously be substituted for the previously mentioned industrial by-product Ingredient 1 (whole fermented broth) in the process described in my aforementioned copending application.

It will be observed that each of the materials employed in the preparation of the above described active artificial fermentation broth are, per se, stable and commercially available.

Aspergillus is a genus of hyphomycetous fungi which are understood to be non-pathogenic particularly in reference to the species *Aspergillus oryzae* and *Aspergillus niger*. *Aspergillus oryzae* is understood to be an enzyme producing specie of Aspergillus and is commercially available from the National Regional Research Laboratories at Peoria, Illinois, under the designated code NRRL–2210.

The *Bacillus subtilis* culture is understood to be a specific culture which is also commercially available from the National Regional Laboratories under the designated code NRRL–B600.

The Lactobacillus culture is commercially available from numerous dairy supply laboratories.

Owing to the fact that these cultures rapidly multiply under conditions employed herein, the proportional amounts added are not critical. Variations in proportions only affect the length of the fermentation period and excessive amounts used is wasteful.

The following example illustrates a commercial batch production carried to the point where it is ready for use, as a nutrition additive, for animal feed.

EXAMPLE

Stage I

A. Fermentable composition (step 1 of above process) _____gallons__ 7000
B. Sugar syrup (49% sugar)—as a nutrient gallons__ 1000
C. *Aspergillus oryzae* (dried culture—crude) lbs__ 450

The above components are mixed together and allowed to ferment at the normal body temperature of the animals which the ultimate end product is intended, until the rate of fermentation becomes retarded.

Stage II

To the resulting first mixture obtained from Stage I above is added:

D. *Bacillus subtilis* (dried culture—crude) ___lbs__ 150

The above mixture is allowed to ferment at the same temperature indicated in Stage I until the rate of fermentation again becomes retarded.

Stage III

To the resulting second mixture obtained from Stage II above is added:

E. Bacillus lacto culture _____lbs___250

The mixture thus obtained is placed in vented containers which may be shipped anywhere. The fermentation is completed during transit and thereafter is quite stable and does not tend to spoil over reasonable periods of time.

The active artificial fermentation broth thus produced at the end of Stage III above is one of the novel products of this invention and may be substituted for the whole fermentation broth (Ingredient 1 above) as a primary material for further processing according to my aforementioned patent. It will be shown later, however, that the product of the present invention, when further processed according to my said patent, produces a food supplement of higher potency than that attained when whole fermentation broth obtained as industrial by-product is used. Furthermore it will be noted that Ingredient 1 above comprises only 12–40% by volume of the mixture sold to the customer for use in animal feeds and drinking water. This represents a large savings in shipping costs.

The active artificial fermentation broth produced at the end of Stage III above is received by a second processor for use as Ingredient 1 above according to my aforementioned patent. The second processor now performs the following operations.

*Stage IV*

Active artificial fermentation broth (from Stage III
 above) _____gallons__ [1]8000
F. Riboflavin whole broth (dried culture) ___lbs__ 200
G. Vitamin $B_{12}$ whole broth (dried culture) __lbs__ 200
H. Add sugar syrup (unrefined) (39.5 Brix) sufficient to obtain osmotic pressure of about 90 atmospheres in terms of standard temperature and pressure conditions.

[1] Approximate.

The acidity in terms of pH value of the above mixture obtained from Stage IV was usually found to be within the required range of 4.00 to 5.80. Where the pH value is found to be outside the required limits choline chloride may conveniently be used to bring the mixture within the required pH range.

The above resulting product obtained from Stage IV is stable for indefinite periods of time at ambient temperatures and is ready for shipment to the ultimate customer (i.e. feed dealers, farmers, etc.). The product thus obtained being stable may be stored with substantially no continued biological activity or deleterious enzymatic reactions, yet all the while remaining in a viable condition. The stabilized and enriched product is utilized by spraying it onto dried grain fodder prior to feeding, or placing the product in drinking water in preparation for feeding livestock or poultry. For example, poultry and animals usually consume twice as much drinking water (by weight) as they consume feed. When 1.5% by weight of the enriched supplement is added to drinking water and/or about 3% by weight is added to the feed, striking improvement in body growth has been observed particularly after the fifth week.

The stabilized product in solution as above described (i.e. product obtained from Stage IV) may be stored in conventional drums; it may be shipped without refrigeration or other special precautions conventional in the food industry.

Furthermore, it may be stored for extended periods prior to use without apparent loss in nutritional value. Once the osmotic pressure and/or pH value of the stabilized product has been altered substantially beyond the aforementioned limits by the addition of water or mixing the product with dried grain the biological activity may be resumed.

An exception to this practice has been made in the preparation of certain dried feeds particularly useful for poultry. The stabilized fermentation solutions (product) are sprayed in measured quantities on the dried grain feeds. The water content of the grain thus treated is controlled to avoid drying but yet the water content is kept sufficiently low to avoid resumption of fermentation activity in the viable broth fraction which has been added to the grain. In so doing the viable fractions of the broth are not destroyed. Utilized in this way it has been found the food values of the whole fermentation product may be conveyed to poultry and livestock in a convenient form.

Feeding tests have been conducted employing food supplements prepared in accordance with my aforementioned patent except substituting the active artificial ferementation broth of this invention for the whole fermentation broth therein mentioned. These tests have shown that there is a higher food value in viable fermentation broths prepared with the active artificial fermentation broth according to the present than that obtained when whole fermentation broth industrial by-product is employed. Thus the potency of the active artificial fermentation broth of this invention is greater than that of whole fermentation broth industrial by-product.

The poultry and animals fed with viable fermentation products prepared according to the invention disclosed in my aforementioned patent modified according to the present invention showed more consistent and larger weight gains (in the order of 15%) than control animals fed identical diets using the same fermentation broths in a dried and non-viable form. Furthermore similar tests showed that when the active artificial fermentation broth of this invention was fermented, during the above described second, third and fourth steps of the process, at a temperature equal to the normal body temperature of the animal a further improvement in weight gain was observed as compared with the whole fermentation broth employed in the aforementioned patent. This does not mean that the second, third and fourth process steps temperature of fermentation is critical in the sense that if it is conducted at a different temperature from the body temperature of the intended animal the product is without benefit to the animal. To the contrary it means that the animal will not be benefited as much as when the fermentation is carried out at the body temperature of the animal. This indicates that there may be some variations in the properties or compounds formed during the biological reactions when the fermentation (reaction) temperature is varied. It thus appears that the most beneficial food supplement for a given animal is obtained when the temperature of fermentation during the second, third and fourth steps of the process of this invention is carried out at the same temperature as the normal body temperature of the animal for which the product is intended.

The sugar syrup employed herein may be any unrefined sugar containing solution derived from various steps in the processing of corn, beet and cane sugars as well as certain food packing and preserving processes.

For example blackstrap molasses may be employed. Vitamins $B_2$ and $B_{12}$ are commercially available in economically and inexpensive form as whole broth. Thus vitamin broth can be utilized thereby saving the cost of employing refined vitamin concentrates. Some vitamins such as choline chloride and niacin are inexpensive in the concentrated form and may be added in that form to the final product.

The hydrogen ion concentration (pH value) is readily measured by using a standard pH meter with glass electrodes or by using standard indicator solutions. The osmotic pressure is apparent osmotic pressure computed from dialysis rates, through regenerated cellulose membranes, of preparations immersed in aqueous solutions of glucose at 50° F. for 24 hours.

Having thus described preferred embodiments of my invention it can now be seen that the objects of the invention have been fully achieved and it must be understood that changes and modifications may be made which do not depart from the spirit of the invention nor from the scope thereof as defined in the appended claims.

I claim:

1. The process for preparing a stable viable fermentation broth comprising the steps of preparing a first composition consisting of a major proportion of water mixed with at least one starch containing non-legume cereal and barley malt in an amount sufficient to convert during fermentation substantially all starch in said non-legume cereal to sugar, adding to said first composition after digesting said starch an effective amount of a non-pathogenic Aspergillus culture to form a second composition, fermenting said second composition until the rate of said fermentation retards, adding to the mass thus obtained an effective amount of *Bacillus subtilis* culture to form a third composition, fermenting said third composition until the rate of said fermentation retards, adding to the resulting mass thus obtained an effective amount of Lactobacillus culture to form a fourth composition, and fermenting said fourth composition until the rate of fermentation retards, thereby forming a viable fermentation broth.

2. The process for preparing a stable viable fermention broth according to claim 1, wherein at least one of the fermentation periods thereof is carried out at the temperature substantially equal to the normal body temperature of a selected animal species.

3. The process according to claim 1, wherein the temperature during fermentation of the second, third, and fourth compositions does not exceed 115° F.

4. A stable viable fermentation broth prepared according to the process of claim 1.

5. A stable viable fermentation broth prepared according to the process of claim 3.

6. The composition of claim 5, wherein the osmotic pressure thereof is within the range of 85 to 100 atmospheres inclusive and the pH is within the range of 4.00 to 5.85 inclusive.

References Cited by the Examiner

UNITED STATES PATENTS

| | | | |
|---|---|---|---|
| 2,095,638 | 10/1937 | Jeffreys | 99—9 |
| 2,370,665 | 3/1945 | Jeffreys | 99—9 |
| 2,452,534 | 11/1948 | Jeffreys | 99—9 |
| 2,906,622 | 9/1959 | Lewis | 99—9 |
| 2,942,977 | 6/1960 | Lewis et al. | 99—9 |
| 2,965,489 | 12/1960 | Clickner | 99—9 |
| 3,151,983 | 10/1964 | Ely et al. | 99—9 |

OTHER REFERENCES

Morrison, Feeds and Feeding, 21st Ed., pp. 170–1, The Morrison Pub. Co., Ithaca, N.Y. (1951).

A. LOUIS MONACELL, *Primary Examiner.*

D. DONOVAN, *Assistant Examiner.*